United States Patent
Kaisser et al.

(10) Patent No.: US 10,151,253 B2
(45) Date of Patent: Dec. 11, 2018

(54) METHOD AND DEVICE FOR ADAPTING A VALVE ACTUATING VARIABLE FOR AN INTAKE AND/OR EXHAUST VALVE OF AN INTERNAL COMBUSTION ENGINE

(71) Applicant: Robert Bosch GmbH, Stuttgart (DE)

(72) Inventors: Alexander Kaisser, Weinstadt (DE); Matthias Heinkele, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 141 days.

(21) Appl. No.: 15/334,842

(22) Filed: Oct. 26, 2016

(65) Prior Publication Data
US 2017/0122223 A1    May 4, 2017

(30) Foreign Application Priority Data
Oct. 29, 2015  (DE) ................. 10 2015 221 203

(51) Int. Cl.
| | |
|---|---|
| *F01L 1/34* | (2006.01) |
| *F02D 13/02* | (2006.01) |
| *F02D 41/26* | (2006.01) |
| *F02D 41/24* | (2006.01) |
| *F02D 41/18* | (2006.01) |
| *F02D 35/02* | (2006.01) |
| *F02D 41/00* | (2006.01) |

(52) U.S. Cl.
CPC ..... *F02D 13/0203* (2013.01); *F02D 13/0261* (2013.01); *F02D 41/2464* (2013.01); *F02D 41/26* (2013.01); *F02D 35/023* (2013.01); *F02D 41/18* (2013.01); *F02D 2041/001* (2013.01); *F02D 2041/002* (2013.01); *F02D 2200/024* (2013.01); *F02D 2200/0406* (2013.01)

(58) Field of Classification Search
CPC .. F02D 13/0203; F02D 13/0261; F02D 41/26; F02D 41/2464; F02D 41/18; F02D 2200/024; F02D 2200/0406; F02D 35/023; F02D 2041/001; F02D 2041/002
See application file for complete search history.

(56) References Cited

U.S. PATENT DOCUMENTS

2005/0205055 A1* 9/2005 Shimizu ............... F02D 9/02
                                                    123/346

* cited by examiner

*Primary Examiner* — Zelalem Eshete
(74) *Attorney, Agent, or Firm* — Norton Rose Fulbright US LLP; Gerard Messina

(57) ABSTRACT

A method for adapting a valve actuating variable for controlling an intake and/or an exhaust valve of an internal combustion engine, including setting a predetermined operating state of the internal combustion engine; determining a charge specification, which specifies an instantaneous air charge in one of the cylinders of the internal combustion engine, in the predetermined operating state; and adapting the valve actuating variable as a function of the charge specification.

8 Claims, 2 Drawing Sheets

METHOD AND DEVICE FOR ADAPTING A VALVE ACTUATING VARIABLE FOR AN INTAKE AND/OR EXHAUST VALVE OF AN INTERNAL COMBUSTION ENGINE

CROSS REFERENCE

The present application claims the benefit under 35 U.S.C. § 119 of German Patent Application No. DE 102015221203.3 filed on Oct. 29, 2015, which is expressly incorporated herein by reference in its entirety.

FIELD

The present invention relates to internal combustion engines, in particular internal combustion engines having camshaft adjusters, for the variable setting of the valve operation of intake valves and/or exhaust valves.

BACKGROUND INFORMATION

The valve operation of intake valves and exhaust valves of an internal combustion engine is controlled by a camshaft. A rotation of the camshaft is fixedly coupled to a rotation of the crankshaft so that a control of the intake valves and the exhaust valves takes place synchronously with a rotation of the crankshaft and, thus, synchronously with power strokes of the internal combustion engine.

Camshaft adjusters are used to vary the valve operation of an intake valve and/or an exhaust valve coupled to a rotation of a camshaft by adapting at least one valve actuating variable to influence the fresh air quantity flowing into a combustion chamber of a cylinder during an intake stroke of the internal combustion engine. This fresh air quantity determines the charge of the internal combustion engine, which in air-guided internal combustion engines largely defines the engine torque provided by the internal combustion engine.

The adjustment of the valve actuating variables may have tolerances of up to 6° crankshaft angle, in particular when they concern opening and closing times of the intake and/or exhaust valves. This may lead in specific operating states, for example in operating modes having a great amount of residual exhaust gas, to an increased error, which may result in an increase in emissions.

SUMMARY

According to the present invention, a method for the adaptation of a valve actuating variable for controlling an intake and/or exhaust valve of an internal combustion engine, as well as a device and an internal combustion engine, are provided.

Further embodiments are described herein.

According to a first aspect, a method for adapting a valve actuating variable for controlling an intake and/or exhaust valve of an internal combustion engine is provided, including the following steps:
 setting a predetermined operating state of the internal combustion engine;
 determining a charge specification, which specifies an air charge in one of the cylinders of the internal combustion engine, for the predetermined operating state;
 adapting the valve actuating variable as a function of the charge specification.

Due to production-related tolerances and tolerances during installation of the camshaft adjuster in the internal combustion engine, systematic errors result when controlling the camshaft adjuster using a valve actuating variable as an actuation variable. One idea of the above method is to adapt the valve actuating variable, which is variably specified for a camshaft adjuster, in particular by providing an adaptation variable.

The valve actuating variable, via the camshaft adjuster, influences the valve operation of the intake valve and/or the exhaust valve at a cylinder in one or multiple valve operating parameters, for example the opening point in time of the valve, the closing point in time of the valve, the phase position of an opening period relative to the position of the crankshaft, a valve lift, etc. Conventional camshaft adjusters may include camshaft phase shifter, electromechanical valve actuators and the like.

The adaptation takes place as a function of an air charge specification specifying the air charge in one of the cylinders of the internal combustion engine. The adaptation makes it possible that a control variable for controlling the camshaft adjuster is made available by the adapted valve actuating variable so that the camshaft adjuster may carry out more easily the desired specification for the camshaft adjuster without providing additional sensors or without providing camshaft adjusters having lower tolerances.

The valve operation of the intake valves acts, as a function of an intake manifold pressure in an intake manifold section, which is connected via the intake valves to the combustion chambers of the cylinders, upon the air charge in the cylinders. A charge error, which is detected based on a pressure measurement, for example a measurement of a pressure in the intake manifold, and a charge model, may be interpreted as a tolerance of the camshaft adjuster, i.e., as an error deviation between a desired valve operating parameter specified by a valve actuating variable and an actually resulting valve operating parameter. A charge error may be ascertained based on the intake manifold pressure via the position of the throttle valve or by analyzing the mixture adaptation; however, these procedures may potentially not be sufficient to achieve a higher accuracy of the camshaft adjuster.

Hence, for an adaptation of the valve actuating variable, an operating point is set and a charge specification is measured. The adaptation may be carried out as a function of the charge specification.

In particular, the adaptation of the valve actuating variable may be carried out as a function of a difference between the charge specification and a reference charge specification dependent on the predetermined operating state. Such a method is preferably carried out at an operating point, at which the air charge in the cylinders reacts as a function of the intake manifold pressure in a very sensitive manner to a change of a valve operating parameter. For example, this is the case for operating points at which a lot of residual exhaust gas remains in the cylinders. Such an operating point is present when, on account of a relatively long period of overlap of the opening times of the intake valve and the exhaust valve at a cylinder, a lot of residual exhaust gas remains in the cylinders or the intake valve is closed at a very early or very late closing point in time.

Furthermore, an intake manifold pressure in an intake manifold of the internal combustion engine connected upstream of the intake valve or a combustion chamber pressure in a combustion chamber of one of the cylinders of the internal combustion engine may be determined as a charge specification.

It may be provided that the adaptation of the valve actuating variable is carried out as a function of a charge-specification difference as the difference between a first charge specification detected for a first operating state and a second charge specification detected for a second operating state.

Furthermore, the adaptation of the valve actuating variable may be carried out as a function of a difference between the charge-specification difference and a reference charge-specification difference for the first and the second operating state.

It may be provided that the first and the second operating state correspond to different operating states, which for adapted valve actuating variables cause identical or similar intake manifold pressures in the cylinders of the internal combustion engine.

In this way, an effect of an error or a tolerance of the intake manifold pressure measurement, for example of an intake manifold pressure sensor, which may significantly influence the determination of the charge specification, may be kept to a minimum. The predefined threshold value results from a model deviation of the charges at constant mass flow.

In particular, the first and the second operating state may correspond to operating states in which equal air mass flows are supplied to the internal combustion engine.

It may be provided that the same air mass flow is set by the same throttle valve position and by the same engine speed for the first and the second operating state. In this way, an effect of an error or a tolerance of the throttle valve adjuster, which may significantly influence the determination of the charge specification, may be kept to a minimum.

Furthermore, the first and the second operating state may be provided having equal air mass flows by way of equal throttle valve positions, different engine speeds and different valve actuating variables.

Furthermore, the operating state may correspond to an operating state in which an overlap of the opening times of the intake valve and the exhaust valve occurs.

The operating state may correspond to an operating state in which a closing point in time of the intake valve is before a bottom dead center of a piston stroke to an extent that the charge is smaller by at least 10% than the charge at a closing of the intake valve at the bottom dead center of the piston stroke. These operating points are often referred to as the Miller cycle.

Alternatively, the operating state may correspond with an operating state in which a closing point in time of the intake valve is after a bottom dead center of a piston stroke to an extent that the charge is smaller by at least 10% than the charge at a closing at the bottom dead center of the piston stroke. These operating points are often referred to as the Atkinson cycle.

Furthermore, the adaptation may be carried out by varying a correction variable, which is applied to the valve actuating variable.

BRIEF DESCRIPTION OF THE DRAWINGS

In the following, specific embodiments of the present invention are described in greater detail on the basis of the figures.

DETAILED DESCRIPTION OF EXAMPLE EMBODIMENTS

Figure 1:
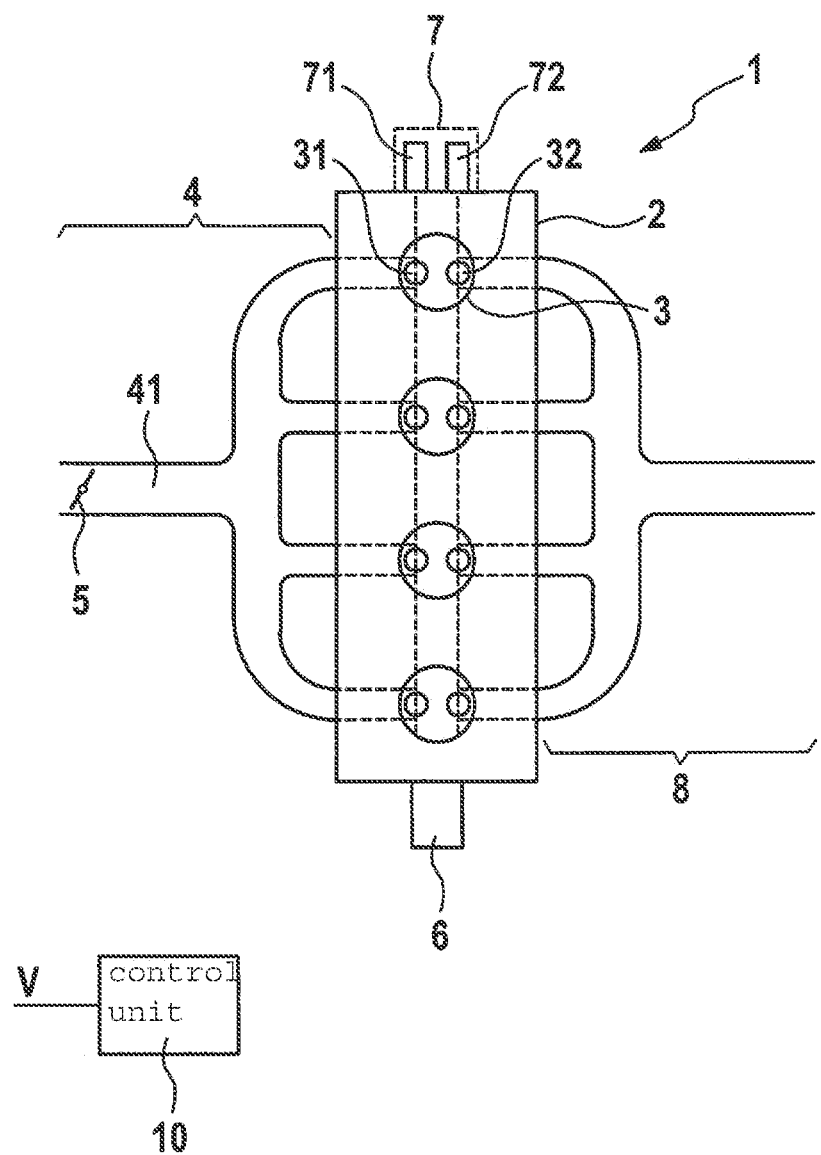
FIG. 1 shows a schematic illustration of an engine system including an internal combustion engine, in which the operation of the intake valves and exhaust valves is variably adjustable with the aid of a camshaft adjuster.

FIG. 1 schematically shows an engine system 1 having an internal combustion engine 2 including a number of cylinders 3 (four cylinders in the present exemplary embodiment). Internal combustion engine 2 corresponds to a conventional four-stroke internal combustion engine, in particular an air-guided internal combustion engine, for example, a gasoline engine.

Air is supplied via an air supply system 4 to the combustion chambers of cylinders 3. Air supply system 4 has an intake manifold section 41, which is defined between a throttle valve 5 and intake valves 31 of cylinders 3. In order to expel combustion exhaust gas into an exhaust gas discharge section 8, exhaust valves 32 are provided at cylinders 3. The operation of intake valves 31 or exhaust valves 32 is determined via the rotation or the crankshaft position of a crankshaft 6, in particular, opening and closing points time are provided synchronously to the power strokes of cylinders 3 of internal combustion engine 2.

Valve operating parameters for the operation of intake valves 31 and the operation of exhaust valves 32 may be variably set with the aid of a camshaft adjusting device 7. Camshaft adjusting device 7 may have separate camshaft adjusters in the form of a camshaft phase shifter for setting a phase position of the opening and closing points in time of intake valves 31 and exhaust valves 32, electromechanical valve actuators for the free adjustment of intake valves 31 and exhaust valves 32 or the like. Valve operating parameters, which are variably influenced by the camshaft adjuster, may include one or multiple of the following parameters: an opening point in time of the respective valve, a closing point in time of the respective valve, an opening period of the respective valve, a phase position of the opening time in relation to a crankshaft angle, a valve lift of the respective valve and the like.

Camshaft adjusting device 7 may have an intake valve camshaft adjuster 71 for setting at least one valve operating parameter for intake valve 31 and an exhaust valve camshaft adjuster 72 for setting at least one valve operating parameter for exhaust valve 32 at a cylinder 3.

A control unit 10 operates internal combustion engine 2. The operation of internal combustion engine 1 [sic; 2] is carried out based on a predefined setpoint input V by adjusting positioning actuators, such as throttle valve 5, camshaft adjuster(s) and the like, as a function of state variables of internal combustion engine 2, for example, a speed, a load, an intake manifold pressure or the like. The operation of internal combustion engine 2 takes place in a conventional manner according to a four-stroke operation.

Usually, the installation tolerance of camshaft adjusters 71, 72 is up to 6 crankshaft angles in relation to their valve operating parameter, which, in particular for operating points at which a lot of residual exhaust gas remains in the combustion chambers of cylinders 3, results in an increased error when setting the air charge. Thereby, the air-fuel ratio changes, which in turn may result in increased emissions.

Figure 2:
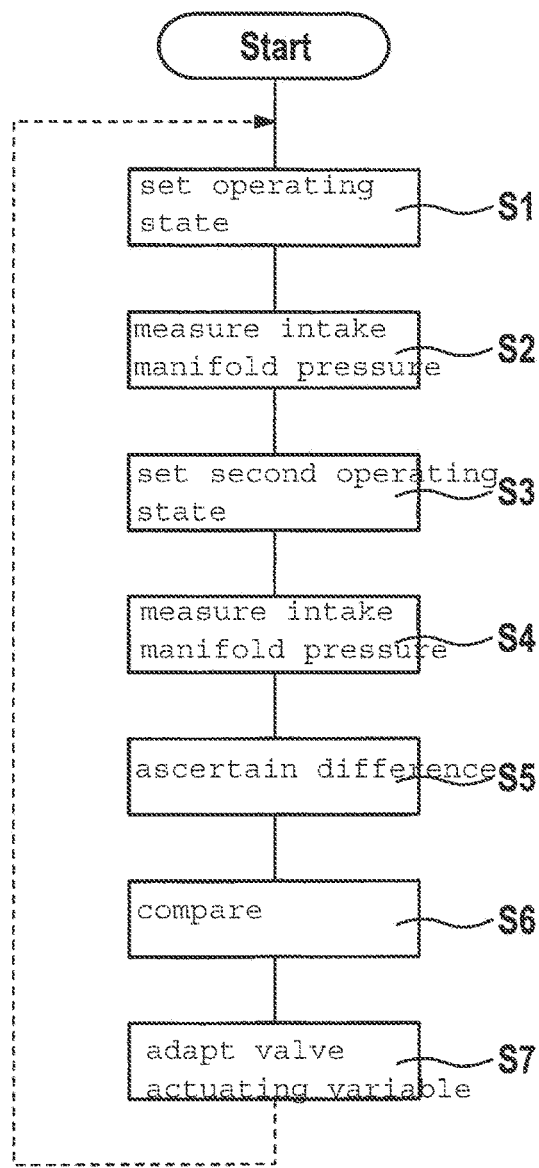
FIG. 2 shows a flow chart for illustrating a method for the adaptation of a camshaft phase position.

FIG. 2 describes a flow chart for illustrating a method for an adaptation of a valve actuating variable. The adaptation may be carried out online and also before starting internal combustion engine 2 after installing camshaft adjusting device 7. In particular, when starting internal combustion engine 2, the adaptation may be carried out particularly precisely by selecting the operating points and ensuring a stationary operation.

In step S1, a predetermined first operating state is set or an operating state corresponding to a predetermined first operating state is established. The operating state of internal combustion engine 2 may be determined by an engine speed, a throttle valve position, an air-mass flow (for example, measured by an air-flow sensor) into internal combustion engine 2 and by a valve actuating variable of intake valve 31 and/or exhaust valve 32.

The first operating state may be selected in such a manner that the air charge reacts very sensitively to a variation of a valve operating parameter due to a tolerance of camshaft adjusters 71, 72. This is, for example, the case for the operating point at which a lot of residual exhaust gas (combustion exhaust gas) remains in the combustion chambers of cylinders 3. A great portion of residual exhaust gas in the combustion chamber of cylinder 3 is present before the onset of a combustion when, for example, the opening times of the intake and exhaust valves 31, 32 of a cylinder 3 overlap. An overlap of the openings of intake valve 31 and exhaust valve 32 of a cylinder may occur when the opening point in time of the intake valve is very early, i.e., before the point in time of closing of the respective exhaust valve.

Figure 3:
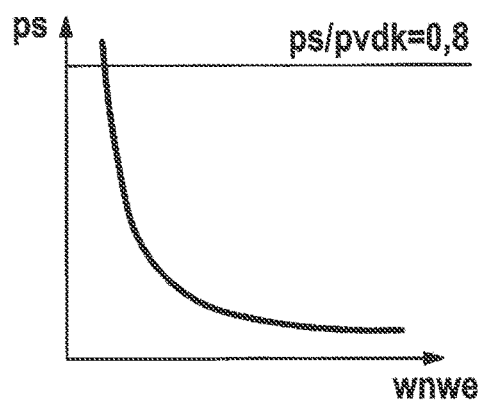
FIG. 3 shows a diagram for illustrating a progression of the intake manifold pressure over a camshaft phase position.

For example, the operating state may be selected in such a manner that a pressure drop, i.e., a pressure ratio ps across the throttle valve (ratio of the pressure on the outlet side in relation to the pressure on the inlet side at the throttle valve as a specification about the intake manifold pressure) of less than 0.8, in particular of less than 0.5 and in particular of more than 0.2. In FIG. 3, it is apparent that at a constant air mass flow, a change of the valve operating parameter wnwe, which, for example, may correspond to a phase position of the opening period of the intake valve, may result in a great change of intake manifold pressure specification ps.

In step S2, an intake manifold pressure representing a first charge specification is measured in the first operating state. The intake manifold pressure in conjunction with the engine speed of the internal combustion engine determines which air mass (charge) is drawn into the combustion chamber of a respective cylinder at each intake stroke and, for this reason, represents a suitable measure for the charge.

In step S3, a predetermined second operating state is set or an operating point corresponding to a predetermined second operating state is established.

In step S4, an intake manifold pressure representing a second charge specification is measured in the second operating state.

In step S5, a difference between the first charge specification and the second charge specification is ascertained as a charge-difference specification.

In step S6, a comparison to a reference charge-difference specification, which results from a selection of the first and the second operating state, establishes whether the actual charge difference of the charges in cylinders 3 is greater, equal or smaller than the charge difference to be expected. The reference charge-difference specification may be retrieved from a charge-difference function as a function of the operating state, for example, from a map table or a lookup table as a function of the first and the second operating state.

In step S7, the valve actuating variable as a function of the difference between the charge-difference specification and the reference charge-difference specification is adapted with the aid of a correction variable. The correction variable may be cyclically increased or lowered in an iterative manner, according to the difference between the charge-difference specification and the reference charge-difference specification. The value of the correction variable may also be directly assigned to the difference between the charge-difference specification and the reference charge-difference specification.

The correction variable may be applied by the valve actuating variable in a multiplicative, additive or other manner. The adaptation takes place in such a way that, when an excessively high charge is established due to the ascertained difference, the valve actuating variable is adapted in such a way that the valve operating parameter thereby provided results in a lower charge, and vice versa.

The adaptation may also be carried out by adapting the valve actuating variable for the control of intake valve camshaft adjuster 71. If the operating states are selected in such a way that an overlap of the valve opening times of intake valve 31 and exhaust valve 32 occurs, the adaptation may alternatively or additionally also pertain to the valve actuating variable for the control of exhaust valve camshaft adjuster 72.

In particular, a skillful selection of the operating states may keep further tolerances of the pressure-based charge detection to a minimum. Since the ascertainment of the intake manifold pressure as a charge specification may, for example on account of tolerances of the intake manifold pressure meter, also be subjected to tolerances, it is meaningful that the operating states for the determination of the charge-difference specification are selected in such a way that specification reacts as little as possible to an error in the intake manifold pressure measurement. In particular, the operating states may be selected in such a way that identical intake manifold pressures result in the case of an error-free or tolerance-free camshaft adjuster.

In order to continuously eliminate or reduce the influence of a tolerance or positional error of the throttle valve position on the ascertainment of charge specifications, it may be provided that the first and the second operating state correspond to operating states having equal air mass flows and identical throttle valve positions, i.e., equal intake manifold pressures. The different operating states are then determined by the variation of the valve actuating variable and the engine speed. A deviation between the intake manifold pressures or charge specifications obtained for the two operating points is assumed to be an error of camshaft adjuster 71, 72 and may be adapted accordingly.

What is claimed is:

1. A method for adapting a valve actuating variable for controlling an intake and/or exhaust valve of an internal combustion engine, the method comprising:
    setting a predetermined operating state of the internal combustion engine;
    determining a charge specification, which specifies an instantaneous air charge in one of the cylinders of the internal combustion engine, in the predetermined operating state; and
    adapting the valve actuating variable as a function of the charge specification;
    wherein the adaptation of the valve actuating variable is carried out as a function of a charge specification difference as the difference between a first charge specification detected in a first operating state and a second charge specification detected in a second operating state.

2. The method as recited in claim 1, wherein the adaptation of the valve actuating variable is carried out as a function of a difference between the charge specification difference and a reference charge specification difference in the first and the second operating state.

3. The method as recited in claim 2, wherein the first and the second operating state correspond to different operating states, which cause identical manifold pressures in the cylinders of the internal combustion engine at adapted valve actuating variables.

4. The method as recited in claim 1, wherein the first and the second operating state correspond to operating states in which the internal combustion engine is supplied with an equal air mass flow.

5. The method as recited in claim 4, wherein the same air mass flow is set by the same throttle valve position and by the same engine speed in the first and the second operating state.

6. The method as recited in claim 4, wherein the first and the second operating state are provided with equal air mass flows by way of equal throttle valve positions, different engine speeds and different valve actuating variables.

7. A device for adapting a valve actuating variable for controlling an intake and/or exhaust valve of an internal combustion engine, the device being configured to:
set a predetermined operating state of the internal combustion engine;
determine in the predetermined operating state a charge specification which specifies an instantaneous air charge in one of the cylinders of the internal combustion engine; and
adapt the valve actuating variable as a function of the charge specification,
wherein the adaptation of the valve actuating variable is carried out as a function of a charge specification difference as the difference between a first charge specification detected in a first operating state and a second charge specification detected in a second operating state.

8. A non-transitory machine-readable memory medium on which is stored a computer program for adapting a valve actuating variable for controlling an intake and/or exhaust valve of an internal combustion engine, the computer program, when executed by a processor, causing the processor to perform:
setting a predetermined operating state of the internal combustion engine;
determining a charge specification, which specifies an instantaneous air charge in one of the cylinders of the internal combustion engine, in the predetermined operating state; and
adapting the valve actuating variable as a function of the charge specification,
wherein the adaptation of the valve actuating variable is carried out as a function of a charge specification difference as the difference between a first charge specification detected in a first operating state and a second charge specification detected in a second operating state.

* * * * *